United States Patent
Michalk

(10) Patent No.: US 8,946,099 B2
(45) Date of Patent: Feb. 3, 2015

(54) TRANSPONDER EMBEDDED IN A FLEXIBLE MULTILAYER SUPPORT

(75) Inventor: Manfred Michalk, Erfurt (DE)

(73) Assignee: HID Global GmbH (DE)

( * ) Notice: Subject to any disclaimer, the term of this patent is extended or adjusted under 35 U.S.C. 154(b) by 1111 days.

(21) Appl. No.: 11/870,969

(22) Filed: Oct. 11, 2007

(65) Prior Publication Data

US 2008/0131669 A1 Jun. 5, 2008

(30) Foreign Application Priority Data

Oct. 12, 2006 (EP) .................................. 06122209

(51) Int. Cl.
*B32B 3/10* (2006.01)
*B32B 27/12* (2006.01)
*B42D 15/00* (2006.01)
*B42D 25/00* (2014.01)
*G06K 19/077* (2006.01)

(52) U.S. Cl.
CPC ............ B32B 27/12 (2013.01); B42D 15/0013 (2013.01); B42D 15/10 (2013.01); G06K 19/07722 (2013.01); G06K 19/07728 (2013.01); G06K 19/07749 (2013.01); *B42D 2033/46* (2013.01)
USPC ............ 442/59; 442/149; 442/150; 442/151; 442/394

(58) Field of Classification Search
USPC .............................. 442/394, 59, 149, 150, 151
See application file for complete search history.

(56) References Cited

U.S. PATENT DOCUMENTS

| | | | |
|---|---|---|---|
| 5,879,787 A | 3/1999 | Petefish | |
| 6,100,804 A * | 8/2000 | Brady et al. | ............... 340/572.7 |
| 6,171,985 B1 | 1/2001 | Joseph et al. | |
| 6,206,292 B1 | 3/2001 | Robertz et al. | |
| 6,233,818 B1 | 5/2001 | Finn et al. | |
| 6,368,687 B1 | 4/2002 | Joseph et al. | |
| 6,412,701 B1 | 7/2002 | Kohama et al. | |
| 6,562,454 B2 | 5/2003 | Takahashi et al. | |
| 6,816,125 B2 | 11/2004 | Kuhns et al. | |
| 7,252,891 B2 | 8/2007 | Higashitani | |
| 2003/0205399 A1 | 11/2003 | Uchihiro et al. | |
| 2004/0119593 A1* | 6/2004 | Kuhns | ........................ 340/572.7 |
| 2004/0262404 A1 | 12/2004 | Fujiki et al. | |
| 2006/0216473 A1 | 9/2006 | Tomany et al. | |
| 2008/0258873 A1 | 10/2008 | Michalk et al. | |

FOREIGN PATENT DOCUMENTS

| | | |
|---|---|---|
| DE | 4337921 A1 | 5/1995 |
| EP | 0570784 A1 | 5/1993 |
| EP | 0913268 | 5/1998 |

(Continued)

OTHER PUBLICATIONS

Translation of JP 2000-251042 to Morinaka (15 pages total).*

(Continued)

*Primary Examiner* — Peter Y Choi
(74) *Attorney, Agent, or Firm* — Sheridan Ross P.C.

(57) ABSTRACT

The transponder with an electronic unit comprising an antenna coil (4) connected to a chip module (5) embedded in a multi-layer laminate support (1) comprises at least one flexible thermoplastic layer (2) disposed on both sides of the electronic unit wherein the multi-layer laminate support further comprises a non-woven foil (3) with a grammage of less than 25 g/m².

10 Claims, 3 Drawing Sheets

(56) References Cited

FOREIGN PATENT DOCUMENTS

| | | |
|---|---|---|
| EP | 0880754 | 12/1998 |
| EP | 1352551 | 10/2003 |
| EP | 1361538 A | 11/2003 |
| FR | 2826154 | 12/2002 |
| JP | 11204358 | 7/1999 |
| JP | 2000251042 | 9/2000 |
| JP | 2002342730 | 11/2002 |
| JP | 2005182389 | 7/2005 |
| WO | 9730418 | 8/1997 |
| WO | 02056657 | 7/2002 |
| WO | 02056657 A | 7/2002 |
| WO | WO 2007/131383 | 11/2007 |

OTHER PUBLICATIONS

European Search Report and Opinion for European Patent Application No. 07118013.7, mailed Jan. 29, 2008.
Search Report issued by the European Patent Office with regard to corresponding European Patent Application No. EP 06122209 on Feb. 14, 2007, 2 pages.
Annex to the Search Report issued by the European Patent Office with regard to corresponding European Patent Application No. EP 06122209 on Feb. 14, 2007, 2 pages.
Examination Report issued by the European Patent Office with regard to corresponding European Patent Application No. EP 06122209.7 on Feb. 14, 2007, 4 pages.
Official Action for European Patent Application No. 06024978.6, dated Oct. 7, 2009.
European Search Report pertaining to EP 06024978, issued by the European Patent Office on Nov. 22, 2007, 2 pages.
Written Opinion pertaining to EP 06024978, issued by the European Patent Office on Nov. 22, 2007, 4 pages.
Official Action for U.S. Appl. No. 11/948,774, mailed Sep, 17, 2009, 7 pages.
Official Action for U.S. Appl. No. 11/948,774, mailed Jan. 13, 2011, 9 pages.
Official Action for U.S. Appl. No. 11/948,774, mailed Dec. 2, 2011, 9 pages.

* cited by examiner

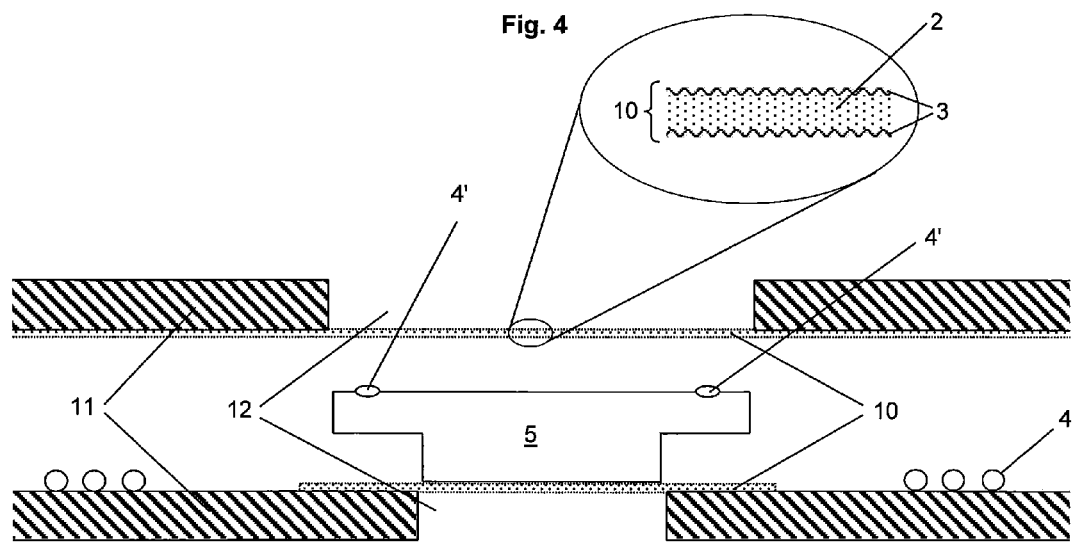
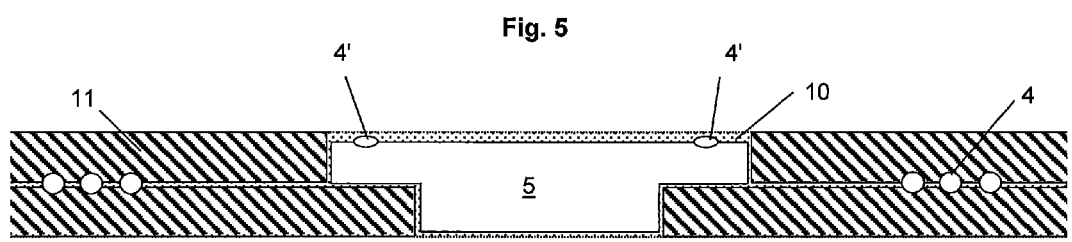
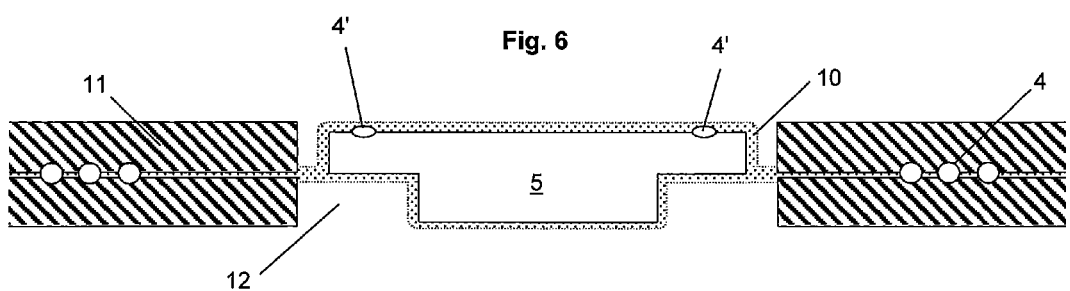

TRANSPONDER EMBEDDED IN A FLEXIBLE MULTILAYER SUPPORT

FIELD OF THE INVENTION

The present invention relates to a contactless transponder embedded in a flexible multi-layer support, and more particularly, to the way such a transponder is mounted in a flexible multi-layer laminate support. More specifically, the invention concerns, the substrate structure to be used to obtain extremely flexible transponders, while keeping the mechanical stability and the stress resistance of classical rigid laminated structures. Inlays for contactless smart cards or for any other laminated structures in which the transponder has to be embedded are one of the particular embodiments of the invention.

STATE OF THE ART

Contactless information carriers such as contactless IC cards have been an expanding technology for years and are now developing into a mature market. One of the most important technical tasks one is faced with is how to simplify the production steps and reduce the unit costs.

Contactless ID cards have been produced for many years on a large scale by using multi-layer lamination techniques. One early example of such techniques is given in DE4337921, where a card inlay is produced in a first lamination step. Cover or protection sheets are then added during a second lamination step to obtain the finished card product. This two-step-process, with inlay production first, has been widely extended to the manufacture of all kinds of transponder products.

The primary function of the inlay packaging is to protect and hold together the active elements of the transponder, meaning at least an IC chip (or module) and an antenna coil connected together. However, such an inlay presents a surface and an appearance quality that are not sufficient to meet market requirements. For this reason, inlays are mostly submitted to a further packaging process, for example by lamination as cited above, in order to form an end product suitable for the market.

Inlays are, for example, produced by arranging the transponder, comprising an IC chip and an antenna coil connected together, on a first plastic foil, covering it with a second plastic foil, followed by overall hot lamination. Typically, PVC or identical material is used as foil material. Alternatively, a transponder can even be delivered arranged on the first foil substrate, without any laminated coverage layer.

By using smoother plastic such as polyurethane (PU) or polyethylene terephthalate glycol (PET-G) and other equivalent materials, one can produce thinner or more flexible transponders, but at the cost of weakening its stress resistance and its mechanical solidity.

Independent of their shape, inlays, cards or others similar products, there is a real need on the market to produce low cost transponders on substrates as flexible as possible, but at the same time keeping a high degree of protection of the transponder integrity.

One response that has been used in the past is to insert one or several non-woven material foil(s), for example made of paper, in the laminated structure. Some examples of this technique can be found in patent applications EP0913268, JP2005182389, EP0570784 or JP2000251042.

An option for such a manufacturing process is to begin by applying or forming the antenna on the non-woven substrate. This step can be achieved by printing or etching techniques, but with great constraint on the quality of the substrate, that must have a minimal density and surface quality.

Alternatively, one can transfer an existing conductive pad as a wire. Such techniques are described in the documents EP1352551, EP0880754, JP11204358 or JP2002342730, in which applications with non-woven substrates are explicitly mentioned.

None of the prior art documents mention the problem that for example lamination with additional plastic layers (PCV, PU, PE, . . . ), requires a certain porosity and thickness, in order to allow the plastic material to penetrate into the non-woven structure and achieve a better adhesion. None of these documents mention low thickness and high porosity as preferable requirements for the use of an non-woven substrate for the transponder. In addition, almost "evanescent" foils have been apparently considered as not reliable substrates for transponders.

SUMMARY OF THE INVENTION

One aim of the invention is to provide an improved, in particular a more flexible transponder.

Another aim of the invention is to provide a transponder inlay that is easy to manufacture and to use, as well as reliable.

A further aim of the invention is to provide a transponder with a substrate structure that allows easy sticking, sewing or fixing of additional materials, as for the example the lamination with further cover material such as PVC, PETG, EVA, PC, Teslin, paper, etc.

A further aim of the invention is to provide a transponder with a smooth laminated substrate material that shows almost no shrinkage after the lamination.

A further aim of the present invention is to provide an improved manufacturing method for such transponders.

The electronic unit of a transponder comprises essentially a transponder chip connected to an antenna used for contactless communication with an external reader. References in the present application to chip or chip module indicate the structure comprising the integrated circuit with RFID functionalities that has to be bound to the antenna. In this application, the expression chip or chip module will be used in an equivalent manner.

Accordingly, an idea of the invention is to provide a transponder with its electronic unit embedded in a multi-layer laminate support comprising at least a thermoplastic layer disposed on both sides of the electronic unit and to add to the structure at least one non-woven foil with a grammage of less than 25 g/m$^2$ positioned in direct proximity of at least one of the said thermoplastic layers. It was unexpected and is advantageous that such a thin and porous (almost evanescent) non-woven foil can be used to drastically improve the characteristics and qualities of the multi-layer laminate support.

There are many advantages to such a structure. The transponder is fully embedded in a very flexible and solid structure. Using smooth polyurethane (PU) for the thermoplastic foils for example is possible. A surprising advantage is that the smooth thermoplastic material is effectively strongly reinforced by the very thin non-woven foil(s). The laminated result can absorb stresses and shearing forces. It is resistant to plastic deformation and returns to its initial shape after being bent for example. Another very surprising effect due to the embedded non-woven fibres is that the shrinking factor during and after the lamination of the thermoplastic material used is almost negligible. This allows the lamination to be carried out at high temperatures to avoid mechanical stress on the module and yield loss. More generally, it is very important to prevent curling or other deformation of the transponder geometry.

In a preferred embodiment of the invention, the non-woven foil has a grammage of less than 10 g/m².

A preferable type of material chosen for the non-woven foil substrate has long and natural fibres. In an embodiment, the fibres have a diameter of less than 25 micrometer. Also, the fibres length should preferably be approximately 2 to 10 mm. Of course, these values are only illustrative and may be varied according to circumstances.

In accordance with at least some embodiments of the present invention, the foil color should also be natural so that after the lamination the fibre is nearly invisible. This kind of material is used to manufacture tea bags for example. Of course, other equivalent materials may be envisaged for the same purpose. Preferably, such substrates are waterproof and even boil-proof. This means that the fibre and the bonding are not sensitive to water, even boiling water or heat.

As can be understood from the present specification, the notion of non-woven foil should be understood as broadly meaning a non-woven fabric such as sheet or web structures bonded together by entangling fiber or filaments (and by perforating films) mechanically, thermally or chemically.

In a specific embodiment, the presence of a non-woven structure on the exterior side(s) of the laminate significantly facilitates the adhesion (by lamination for example) of a further cover layer. In such a case, the non-woven structure will reinforce the lamination interface, as it can easily be fully penetrated by the two lamination materials. Accordingly, this procedure overcomes one of the weaknesses of the laminated structures known in the art. When a thicker and more dense non-woven structure is used as an interface, it can become a de-lamination weakness point, if not fully penetrated by the lamination material.

In a preferred embodiment of the invention, the electronic unit is mounted on a flexible core layer that is incorporated in the centre of the final multi-layer laminate structure.

In a further aspect of this embodiment, the non-woven foil is arranged between the two thermoplastic layers. Alternatively (or additionally), a non-woven foil can be disposed outside of each thermoplastic layer.

In another embodiment, non-woven foils and soft thermoplastic layers are combined on both sides of the electronic unit in order to form an embedding patch. Preferably, the embedding patch comprises a very thin layer of soft thermoplastic material disposed between two of the non-woven foils. Such patch can be thinner than 100 micrometers.

In a further aspect of this embodiment, one of the patch layers has a surface area smaller than the antenna surface, but larger than the surface of the chip module. In the case where the multi-laminate support comprises additional laminate layers showing a (punched) window in order to accommodate the chip module, the patches could be adapted in order to extend just over the size of the windows.

In another aspect, the non-woven foils can comprise special design features such as color for marking or openings. If a special tamper-proof marking is necessary one can print a sign (a colored watermark) on the foil, which then appears on the middle of the laminated sheets as a sign. Also, one can use the foil with some especially long colored fibres (security fibres). It can be inserted partially or comprise an opening, if the fibre in specific foil parts is not desired.

The invention further relates to the manufacture of the transponder. Preferably, the multi-layer laminate support is assembled as a stack and then laminated together with the electronic unit inside the stack. This results in a planar laminate structure where the non-woven foils are at least partially embedded in the filling material. As the non-woven foils are very thin and porous, the filling material can easily penetrate them. This makes the lamination much easier and less time and energy consuming than with a thicker and denser paper structure for example, as indicated in the state of the art mentioned above.

BRIEF DESCRIPTION OF THE DRAWINGS

It will be easier to understand the invention by means of a detailed description and the following drawings in which:

FIG. 4 shows a fourth embodiment of a stack arrangement of the elements of the transponders according to the invention before lamination FIG. 5 shows a fourth embodiment of a stack arrangement of the elements of the transponders according to the invention after lamination FIG. 6 shows a fifth embodiment of a stack arrangement of the elements of the transponders according to the invention after lamination

DETAILED DESCRIPTION

Figure 1:
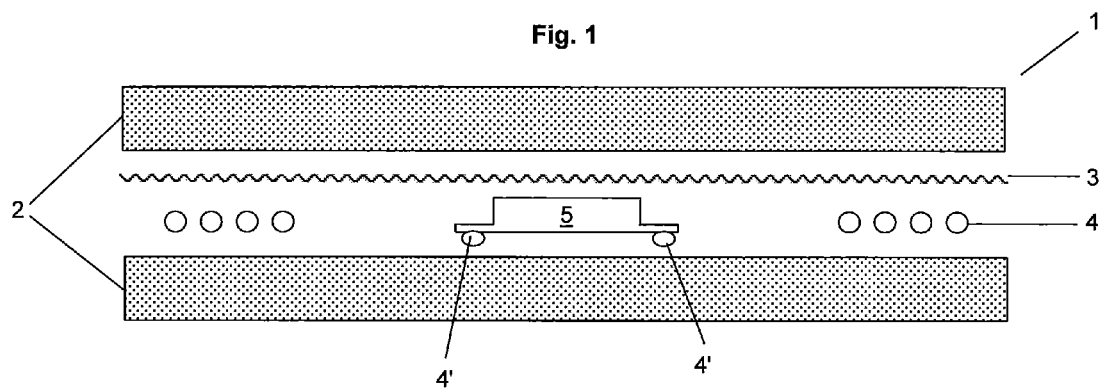
FIG. 1 shows a first embodiment of a stack arrangement of the elements of the transponder according to the invention before lamination

FIG. 1 shows a first embodiment of the multi-layer laminate support 1 of the invention which comprises a chip module 5 to which an antenna coil 4 is connected by contact ends 4', said chip module and antenna being placed between two thermoplastic layers 2. According to the invention, there is, in addition to the two thermoplastic layers 2, a further layer 3 which is a non-woven foil. This foil 3 is shown placed on top of the antenna 4 and module 5, but it can of course also be placed underneath said antenna 4 and module 5.

The non-woven substrate 3 is very thin, in particular in comparison to the antenna coil. It is made of non-woven long fibers put together in the form of a sheet and bonded, either mechanically, by thermal bonding, by chemical bonding (binder, adhesive), by hydro-entanglement, by needle felt, etc. In the present invention one envisages the use of a very thin and very porous type of non-woven sheet, presenting long fibers and small quantities of bonding material (if used). The non-woven foil defined herein differs from paper essentially in the length of the fibers, as paper is generally made of much shorter, cellulose fibers. The real difference is, however, the lack of hydrogen bond in the fibers of the non-woven foil, which defines the solidity of the paper. By contrast, the solidity of the non-woven substrate is essentially defined by the self-adhesive characteristic of the fibers, even if additional means as cited above (thermal, binder, adhesive, etc.) could be used for reinforcement purposes.

Preferably, the non-woven foil 3 is a foil with a grammage of less than 25 g/m². This limit corresponds to that for silk paper definition. Preferably one uses a non-woven foil with a grammage of less than 20 g/m² and more preferably with less than 10 g/m². Of course, these are illustrative values that should not be considered as a limitation in the scope of the present invention.

Another important characteristic of such material is that it is waterproof (due to the lack of hydrogen bond). It can be put into water, and is even stable when boiled or ironed. This kind of material is typically used to manufacture tea bags, filters, or cleaning paper for lenses for example. It can also be defined as a non-woven fabric foil or non-woven gauze foil.

An example of such a material is Dynatec 8.5/LCM of Papierfabrik Schoeller & Hoesch GmbH & Co. It has a grammage of 8.5 g/m² and a thickness (calliper) of 35 micrometers. It is made of fibres with a diameter of less than 25 micrometers. Of course, this is only a specific example and other equivalent similar materials may be used.

The arrangement of FIG. 1 is then submitted to a lamination process. As the non-woven foil 3 is very thin and porous, the filling material can easily penetrate, making the lamination much easier. As there is no shrinking of the substrate during lamination, the temperature can be very high. This prevents yield loss caused by mechanical stress on module.

Possible thermoplastic materials for the layers 2 are for example polyethylene terephthalate glycol (PET-G) or polyurethane (PU; for ex. Walopur 4201 AU of Epurex). Other equivalent materials might of course be envisaged in the frame of the present invention. Examples for lamination parameters for PU as thermoplastic material are 180-205° C. and 20-60 N/cm² in the heating circle.

It has to be noted that after the lamination, the non-woven foil 3 as such is almost no longer detectable inside the laminated structure. In the case illustrated in FIG. 1, the "evanescent" network of non-woven fibers is completely embedded in the thermoplastic material and the continuation of its structure is very difficult to distinguish. As a result, the non-woven fibers significantly reinforce the smooth thermoplastic material. The lamination thus generated is able to absorb stresses and shearing forces. It is resistant to plastic deformation and goes back to its initial form after being bent for example. One of the most important result of this structure is that the shrinking factor of the filling material after the lamination will almost disappear, due to the effect of the non-woven foils. This prevents curling or other deformations of the transponder geometry.

Figure 2:
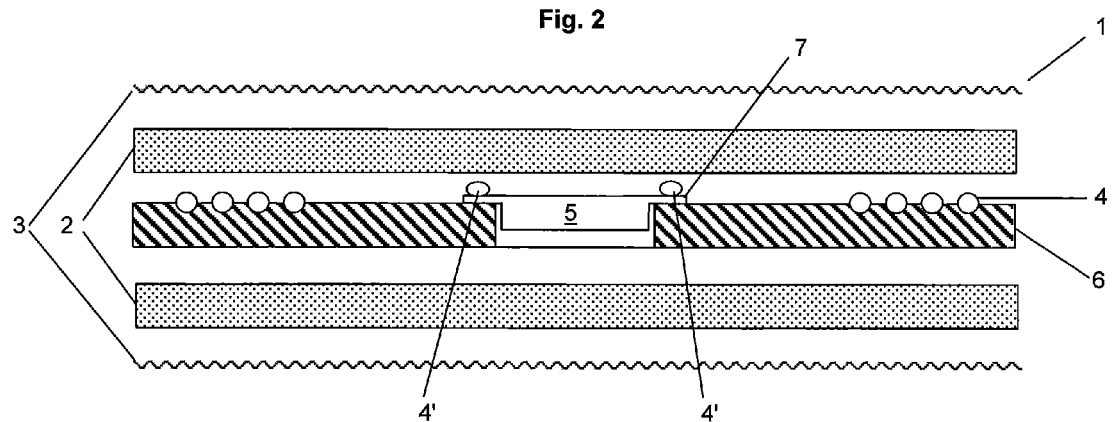
FIG. 2 shows a second embodiment of a stack arrangement of the elements of the transponder according to the invention before lamination

FIG. 2 shows another embodiment of a transponder according to the present invention. In this embodiment, the chip module 5 and the antenna 4 are placed on a core layer 6, said antenna 4 being connected to the module 5 through contact ends 4' on contact pads 7. This assembly is then laminated between two thermoplastic layers 2. Finally a layer of non-woven foil 3 is added on each side of the thermoplastic layers 2 according to the invention. Of course, in a variant, it is possible to add only one layer of non-woven foil 3 rather than two as shown.

In another variant, it is also possible to combine the first and second embodiment illustrated in FIGS. 1 and 2 and to use a first non-woven foil 3 placed between the two thermoplastic layers (as in FIG. 1) and a second non-woven foil placed over one (or two) thermoplastic layer(s).

Figure 3:
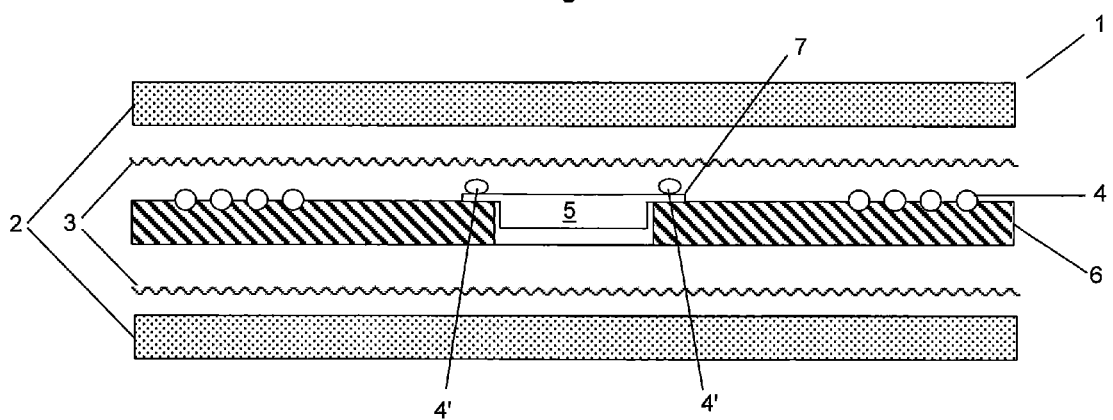
FIG. 3 shows a third embodiment of a stack arrangement of the elements of the transponder according to the invention before lamination

FIG. 3 illustrates a further embodiment of the present invention, where two non-woven foils 3 are placed between the two thermoplastic layers 2, one foil on each side of the module 5 and antenna 4. In this embodiment, as in the one illustrated in FIG. 2, the antenna 4 and the chip 5 are placed on a core layer 6.

Any combination of the illustrative embodiments of FIGS. 1 to 3 can of course be envisaged with the addition of a foil of non-woven material in any a designated position.

FIG. 4 shows another embodiment of the transponder according to the present invention. In this embodiment, the non-woven foil 3 and the soft thermoplastic layer 2 are combined to form an embedding patch 10. In FIG. 4, the patch 10 comprises two non-woven foils 3 placed on each side of the thermoplastic layer 2 (as illustrated in the enlarged detail of FIG. 4), but it is also possible to use only one non-woven foil 3 per patch. Such patches 10 are placed directly on both sides of the electronic unit and aim to form a first embedding envelope around it when they have been joined together after the lamination. Preferably, as shown in the figures, the patches 10 should be very thin, less than 100 micrometers (thinner than the wire diameter of the antenna wire). Thinner patches 10 are preferable in order to reduce the amount of material.

One can also choose to reduce the surface size of the patches 10, or at least of one of them. In the example shown in FIG. 4, the lower patch 10 is reduced approximately to the size of the chip module 5 (just a little bit larger), and placed just below it. In such a configuration, only the chip module 5 (and the extremities of the antenna wire 4 bonded to it) will be fully embedded in the envelope due to having laminated the two patches 10 together. Depending on the configuration of the stack to be laminated and the different materials used, any alternative is possible: two small patches around the module, patches with a hole around the module, etc.

The use of such patches 10 is particularly advantageous in such a special multi-layer laminate support configuration as shown in FIG. 4. Two additional laminate layers 11 are disposed externally on each of the embedding patches. Each of these layers 11 show a window 12 formed to accommodate parts of the chip module 5. The patches 10 are dimensioned and positioned in such a way as to entirely cover the windows 12.

FIG. 5 shows the transponder after the lamination of the stack arrangement of the FIG. 4. The two layers 11 have been laminated together, embedding the antenna wire 4 and the external (radial) parts of the patches 10. The windows 12 have been dimensioned in order to match precisely the dimensions of the chip module 5. The central parts of the patches 10 form a thin encapsulation envelope around the chip module 5, that fix the module in the laminated structure and protect the external faces of it. The cumulative thickness of the layers 11 has been chosen to match the thickness of the module 5. This construction results in a transponder with an electronic unit fully embedded in a multi-layer laminate structure just as thin as the chip module 5 itself.

The laminate layers 11 can, for example, be made of paper, paper-like material, foamed plastic or silica loaded polyolefin (Teslin). Such materials have the particularity of a porous structure and need adhesive means to be laminated together. Accordingly, the patches 10 themselves can serve also as adhesive for such materials. In FIGS. 4 and 5, the upper patch 10 has approximately the same dimension as the layers 11. After the lamination, the thermoplastic material 2 and the non-woven material 3 have penetrated inside the two layers 11, and will ensure a long-term joining of the two layers 11. In such a case it is advantageous when at least one of the patches 10 has the same surface area as the laminate layers 11. In FIG. 5, a space has been left between the two layers 11 and filled with patch material. This is only done to provide more clarity and an explanation. In reality, if the lamination has been properly made, the two layers 11 will join together perfectly and the patch material will have been absorbed at the interface of the two layers 11.

The laminate layers 11 can also be made of plastic material such as polycarbonate (PC), polyvinyl chloride (PVC), etc. In such cases, no adhesive material is needed, and both patches 10 could be dimensioned (if desired) relative to the size of the windows 12. In such a case, the patches 10 will serve to encapsulate the chip module 5 and to hold it in the recess formed by the two windows 12, almost like in a hammock, to use an image.

This can result in an extreme case as the embodiment represented in FIG. 6. The windows 12 have been dimensioned much larger than the module 5. After the lamination, the module is held in position only by the envelope created from the two patches 10 (and also partially by the two extremities 4' of the antenna wire 4 that are bonded to the contact pads 7 of the module). Such an embodiment can be interesting when material such as PC is used for the layers 11. It is known that tensions are produced as a result of the various shrinking characteristics of the material used for the support layer 11 and of the module 5 as a whole, resulting in cracks or warps of the transponder (support). If the windows 12 are large enough, no tension between the layers 11 and the module 5 will appear. Additionally, the patch 10 material, made by the non-woven foils 3 and the thermoplastic layer 2, is able to compensate for the difference in shrinkage between the layers 11 and the module 5. Such a solution can be highly interesting for the manufacture of (almost) full PC contactless cards.

In most cases, the voids remaining in the windows 12 as represented in FIG. 6 are not desired. Additional filling material, such as small sheets of thermoplastic material (i.e. PET-G or PU), can be added to the stack arrangement prior to the lamination. This filling material will melt during the lamination and fill the undesired voids. These voids could also be filled afterwards by material injection for example.

The transponders represented in FIGS. 5 and 6 show a very thin support, in fact as thin as the module 5 itself, and can be sold in this way as inlays on the markets. One can also form a card by adding multiple cover layers, either before the lamination, or with a second lamination step. One can also produce dual interface cards (contact/non-contact), where the top patch 10 should for example present cuts in order to leave the upper contact pads of the module free.

Figure 7:
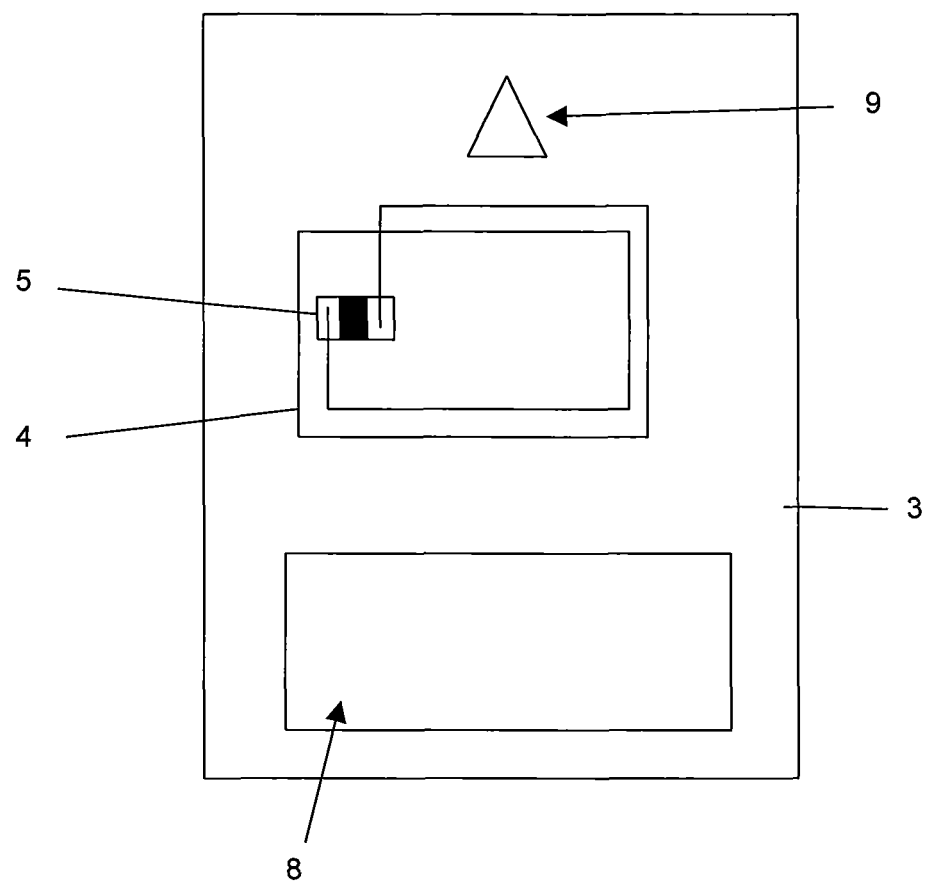
FIG. 7 shows a top view of the third embodiment with special cut-outs of the non-woven foil

FIG. 7 shows the top view of a further embodiment of the non-woven foil 3 for example from FIG. 1. In this embodiment, the foil 3 may comprise an opening 8 if one wishes to avoid the use of such a material in a particular zone, and also a marked sign 9, for example printed in color as a security feature to protect the final product against forgery. Also shown for the sake of clarity is the antenna 4 and a chip module 5.

Although the invention has been shown and described with respect to certain preferred embodiments, it is obvious that equivalent alterations and modifications may be envisaged by others skilled in the art upon the reading and the understanding of this specification and the annexed drawings.

The application of the invention is not restricted to contactless cards. Many different uses of transponders according to the invention are possible. Of interest are in particular applications where the transponder has to be as thin as possible and at the same time able to endure extreme environmental stresses.

Particularly advantageous is the use of the present invention for laminated structures in which the transponder has to be embedded. A possible example are skis. Since this kind of product presents a complex laminated structure and is submitted to strong environmental stresses (pressure, torsion, extreme temperatures (from minus 50° C. to +80° C.). Incorporating an external element in the laminated structure creates weaknesses and could lead to de-lamination under extreme conditions. The use of a transponder according to the invention has proven to be efficient to minimize such risks, in particular when the same material (for example PU) is used for the thermoplastic material and for the layers of the ski that are in direct contact with the transponder.

Other applications may of course be envisaged in combination with other objects since the examples given above are for illustrative purposes.

LIST OF NUMERICAL REFERENCES 1 multi-layer laminate support
2 soft thermoplastic layer
3 non-woven foil
4 antenna coil
4' contact ends of antenna
5 chip module
6 core layer
7 contact pad
8 window in the non-woven foil
9 printed sign on the non-woven foil
10 embedding patch
11 laminate layer
12 window

What is claimed is:

1. A transponder, comprising:
    an antenna coil;
    a chip module connected to the antenna coil; and
    a laminate structure, comprising:
        a first thermoplastic layer;
        a second thermoplastic layer; and
        a porous non-woven foil with a grammage of less than 25 g/m$^2$, the porous non-woven foil consisting of non-woven fibers substantially lacking hydrogen bonds, wherein at least some material from the first thermoplastic layer penetrates the porous non-woven foil between the non-woven fibers and the penetrating material bonds directly with at least some material from the second thermoplastic layer during lamination of the first thermoplastic layer, second thermoplastic layer, and the porous non-woven foil, and
    wherein the antenna coil and chip module are both embedded in the laminate structure.

2. The transponder of claim 1, wherein at least some material from the second thermoplastic layer also penetrates the porous non-woven foil.

3. The transponder of claim 1, wherein the non-woven fibers create an evanescent network that is completely embedded in material of one or both of the first and second thermoplastic layers.

4. The transponder of claim 1, wherein the non-woven fibers comprise a grammage of less than 10 g/m$^2$.

5. The transponder of claim 1, wherein the non-woven fibers comprise a diameter less than about 25 micrometers.

6. The transponder of claim 1, wherein solidity of the non-woven foil is defined by self-adhesive characteristics of the non-woven fibers.

7. The transponder of claim 1, wherein at least one of the first and second thermoplastic layers comprise at least one of polyurethane and polyethylene terephthalate glycol.

8. The transponder of claim 7, wherein the first and second thermoplastic layers comprise the same material.

9. The transponder of claim 1, wherein the non-woven foil is positioned on top of the antenna coil and the chip module.

10. The transponder of claim 1, wherein the non-woven foil is positioned underneath the antenna coil and the chip module.

* * * * *